United States Patent [19]

Vigneau et al.

[11] Patent Number: 5,064,974
[45] Date of Patent: Nov. 12, 1991

[54] COMPARTMENT FOR REMOTE TRANSMITTER OR THE LIKE

[75] Inventors: Lawrence Vigneau, Allen Park; James D. Dowd, Farmington Hills, both of Mich.

[73] Assignee: United Technologies Automotive, Dearborn, Mich.

[21] Appl. No.: 505,737

[22] Filed: Apr. 6, 1990

[51] Int. Cl.⁵ .......................... H01H 3/16; B60R 5/00
[52] U.S. Cl. ................................. 200/61.62; 296/37.7
[58] Field of Search .............. 200/61.62, 61.58 R, 200/61.7, 330, 332; 296/37.1, 37.7; 312/319, 320, 321.5; 224/42.42, 311, 312

[56] References Cited

U.S. PATENT DOCUMENTS 4,595,228  6/1986  Chu .......................... 312/319 X

Primary Examiner—J. R. Scott

[57] ABSTRACT

A compartment for accommodating a remote-control transmitter for a garage door opening system or the like includes an actuator button (105) which operates a lever (95) pivotably mounted to the door of the compartment. An upstanding pin on the lever operates a push button switch on the transmitter. The compartment includes a plurality of such pins (112) of various dimensions receivable within a number of apertures (112) in the lever. The multiple combinations of pins and apertures render the compartment useful with a wide range of transmitters of various sizes, shapes and push button locations.

10 Claims, 2 Drawing Sheets

COMPARTMENT FOR REMOTE TRANSMITTER OR THE LIKE

DESCRIPTION

1. Technical Field

This invention relates generally to a compartment for accommodating a remote control transmitter for a garage door opening system or the like, and specifically to such a compartment which is conveniently adaptable to remote control transmitters of various sizes, shapes and operating switch locations.

2. Background Art

Accommodation of such articles as remote control radio transmitters for garage door opening systems and the like within an automobile's interior, leaves limited room for extra storage therein. Today's sophisticated automobile purchaser demands interior storage for such articles along with various other personal belongings, which oftentimes cannot be fulfilled by the traditional instrument panel glove compartment. Thus, modern automobile interiors may employ many diverse storage compartments, such as bins and trays, in such areas as the instrument panel, interior door panels and center console located between the driver and passenger seats.

Recently, automobile ceilings have been explored as locations for storage compartments for such objects as the remote control transmitters mentioned above. An example of such a console specifically adapted to such a transmitter is found in Chu U.S. Pat. No. 4,595,228. While the Chu console may be considered well adapted for some single button transmitters, it may not be sufficiently adaptable to accommodate a wide variety of transmitters having diverse shapes and locations thereon of the operating switch buttons. In the Chu console, the location of the transmitter within the console is adjustable as is the height of a plunger extending inwardly from a push-on push-off actuator panel. With an ever increasing number of domestic systems employing remote control transmitters, a compartment which accommodates a greater number of transmitters of diverse sizes, shapes and switch locations thereon, is therefore desirable.

DISCLOSURE OF INVENTION

In accordance with the present invention, a compartment (console) for accommodating a remote transmitter for a garage door opening system or the like, includes means on the compartment's actuating member for connecting that member with the transmitter switch push button, throughout an enhanced range of longitudinal and lateral locations within the compartment. The transmitter may be mounted to the interior of the compartment throughout a wide range of locations therein, whereby between the adjustability afforded by the adjustable connecting means and the wide range of transmitter mounting locations within the compartment, the compartment is useful with many remote control transmitters of diverse garage door opening systems or the like. In the preferred embodiment, the means for connecting the compartment's actuating member with the transmitter switch, comprises a pivotable lever having a plurality of apertures spaced thereon and a number of pins of various length which are snap-fit within the apertures. Thus, unlike prior art compartments wherein only the length of the plunger is adjustable, in the console of the present invention, the length of the pins as well as the lateral location thereof are adjustable for enhanced flexibility and utility. The actuating member may be accommodated between two spaced panels in a door which allows access to the interior of the compartment, the inner panel including means thereon for fixing the remote control opener thereto. The inner panel is provided with a slot through which the pins engage the transmitter's switch push button, the slot being provided with indicia adjacent thereto for alignment of the transmitter and the operating switch thereof with the pin on the lever.

BEST MODE FOR CARRYING OUT THE INVENTION

Figure 1:
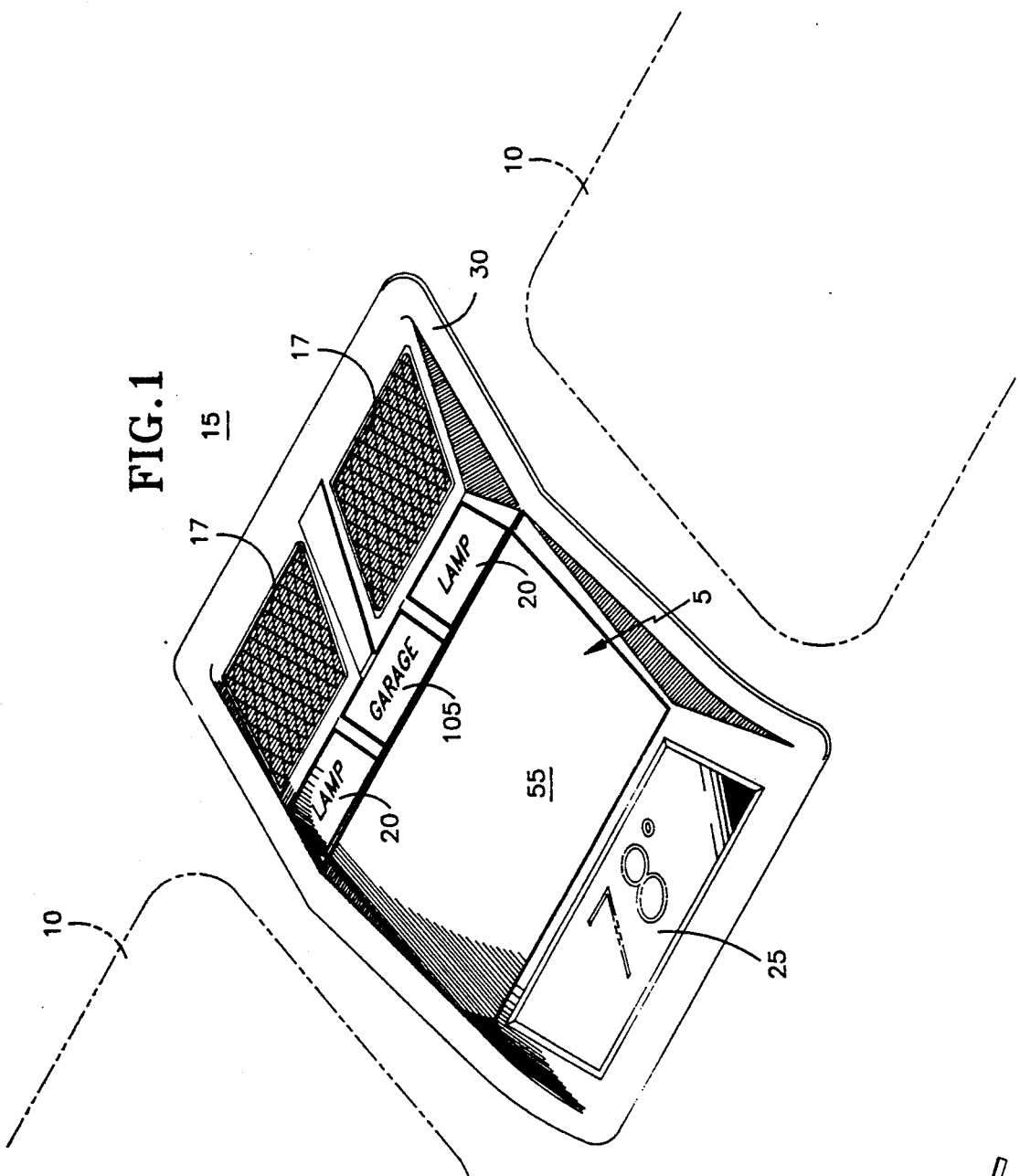
FIG. 1 is a perspective view of one embodiment of the compartment of the present invention.

Referring to FIG. 1, the compartment console of the present invention is shown generally at 5, mounted in a forward portion of the ceiling of an automobile passenger compartment. Thus, when viewed from the perspective of the vehicle's driver, the compartment would occupy space between sun visors 10 in the vehicle's headliner 15. As shown, the compartment may form part of a larger console including driver and passenger map reading lights 17 actuated by push button actuator switches 20 and a digital display 25 indicating such information as passenger compartment temperature, time or other useful information. The console may be formed from molded plastic or other similar material including a decorative bezel 30 around the outside edge of the console, and may be fixed to the vehicle's ceiling either by attachment to the headliner, or attachment to a rigid header in the vehicle's roof by snap fit fasteners, self tapping screws or the like (not shown).

Figure 2:
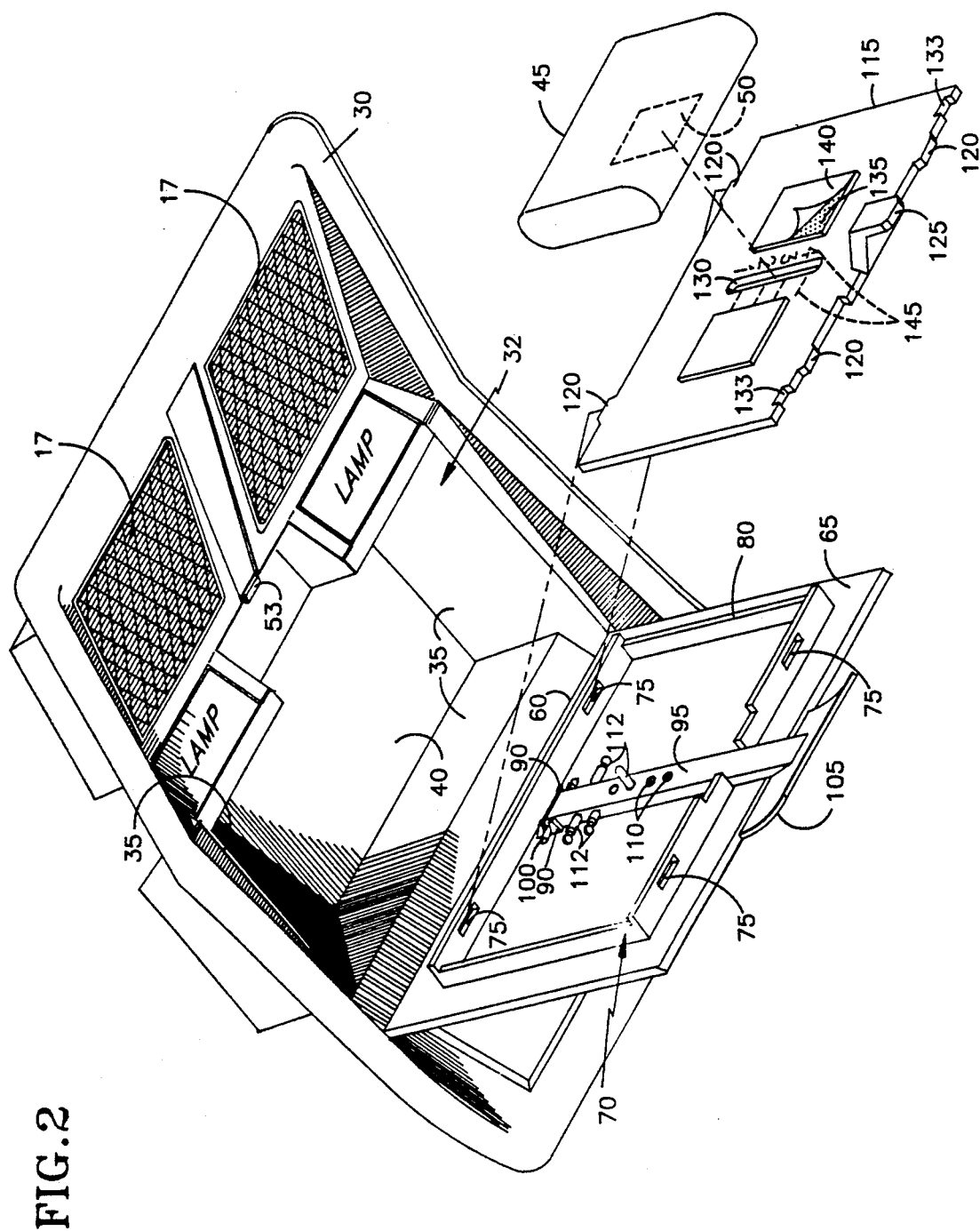
FIG. 2 is a view similar to FIG. 1 but showing a door of the compartment in an open, exploded configuration for enhanced illustration of the detailed structure thereof.

Referring to FIGS. 1 and 2, compartment 5 comprises a housing 32, including sidewalls 35 and upper wall 40 and accommodating therein remote control transmitter 45 having a push button operator switch shown in phantom at 50. While the transmitter is discussed hereinafter as being a single push button remote control transmitter for a garage door opener or the like, it will be understood that the invention herein is useful with remote control transmitters for such other systems as domestic lighting systems or security systems, and having any number of push button switches thereon. The housing includes a catch 53 at the rear wall thereof and opens downwardly, being closed by a pivotable door 55 hinged to the housing by any suitable means (not shown) along forward edge 60 thereof. In the preferred embodiment, the door may be molded from plastic or the like with integral hinge pins (not shown) extending outwardly from edge 60 and received within mating apertures (not shown) in sidewalls 35. As best seen in FIG. 2, door 55 comprises an outer panel 65 which, on the outside surface thereof, may be grained or decoratively treated in any other appropriate manner to aesthetically compliment the headliner, visors, and other interior trim components. Outer panel 65 has an open rectangular standoff or spacer 70 molded on an inner surface thereof. Standoff 70 is provided with a plurality of rectangular slots 75, opposed recesses 80 and a forward slot 85. Outer panel 65 is also provided with a cradle or pivot mount 90 molded integrally therewith at the inner surface thereof.

Figure 3:
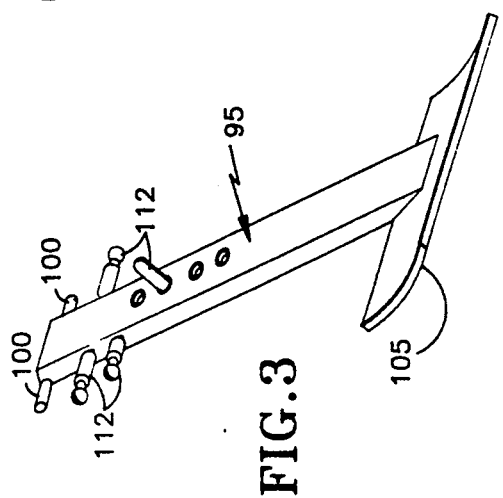
FIG. 3 is a perspective view of a mechanical actuating member associated with the compartment.

Referring to FIGS. 2 and 3, a pivotable lever actuating member 95 is received within forward slot 85 above outer door panel 65. Lever 95 is formed from synthetic plastic or the like and includes pivot pins 100 which are molded into the forward end thereof, extending outwardly therefrom and snap-fitting within cradle 90, whereby the lever is pivotably supported on the inner surface of door panel 65. The rearward end of lever 95 is provided with an integral actuator button 105 which, when the door is latched closed, presents itself to the occupants of the vehicle between lamp push button switches 20 (see FIG. 1). Lever 95 is also provided with a number of apertures 110 which, in the preferred embodiment, are longitudinally and evenly spaced along a medial portion of the lever. A plurality of actuator feet or pins 112 of varying length are integrally molded with lever 95 extending outwardly from the edges thereof and frangibly connected thereto at weakened portions. The outer ends of the attached pins comprise bifurcated snap-fittings which, when pushed into apertures 110, firmly affix the appropriate pin (depending upon the type of transmitter received within the housing) to lever 95.

Door 55 also comprises a molded plastic inner panel 115 including tabs 120 which are received within slots 75 in standoff 70 whereby the inner panel may be snap-fit to the standoff such that the ends of the inner panel are received within recesses 80 in the standoff. Standoff 70 spaces the inner panel from the outer panel, thereby allowing freedom of movement of lever 95. Inner panel 115 also is provided with a tongue 125 which cooperates with catch 53 in the housing to maintain the door in a closed and latched position. The inner panel 115 is slotted at 130 thereby allowing access to push button switch 50 on the transmitter by pin 112 upstanding from lever 95. Slots 133 in the rear edge of the inner panel receive the tip of a screwdriver or similar tool for unsnapping the inner panel from the standoff. The inner surface of inner panel 115 is provided with double-stick, pressure sensitive adhesive pads 135 covered by removable paper strips 140 for adhesively mounting transmitter 45 to the inside of the inner panel. The outer surface of inner panel 115 is provided with indicia 145 corresponding to the location of holes 110 in lever 95 for alignment of transmitter switch button 50 with projecting pin 112 upstanding from the lever prior to the attachment of the transmitter to the inner panel.

Transmitter 45 is assembled to the compartment as follows. With a screw driver or other similar instrument, catch 53 is bent slightly upwardly and disengaged from tongue 125 on inner panel 115, allowing the door to pivot open under its own weight. Inner panel 115 is unsnapped from the outer panel with a screwdriver inserted within slots 133. Cover strips 140 are removed from adhesive pads 135 and transmitter 145 is pressed onto the pads, adhesively securing the transmitter to the inside of inner panel 115. Proper alignment of the transmitter with the inner panel for alignment with upstanding actuator pin 112 is achieved by alignment of transmitter switch button 50 with indicia 145 prior to the attachment of the transmitter to pads 135. Printed instructions provided with the compartment will instruct the user as to which indicia should be used for such alignment depending upon the manufacturer and model of the transmitter. Likewise, the instructions will inform the user which of pins 112 should be severed from the edge of lever 95 and which aperture 110 such pin should be snap-fit into. Once the transmitter is attached to the inner panel, and the proper pin is snap-fit into the appropriate aperture in lever 95, the inner panel is snapped back onto standoff 70 and door 75 is closed and latched with tongue 125 and catch 53 such that upstanding actuator pin 112 is aligned with transmitter switch button 50.

From the foregoing, it will be seen that the compartment of the present invention provides versatile, convenient and attractive accommodation of a remote control transmitter. The transmitter is actuated by pressing on button 105 which pivots lever 95 and pin 112 upwardly into engagement with transmitter switch button 50 through slot 130. The compartment will accommodate a wide range of transmitters of various sizes, shapes and switch configurations due to the range of transmitter mounting orientations on adhesive pads 135 and combinations of pins and apertures on lever 95.

While a particular embodiment of the compartment of the present invention has been shown and described, it will be understood that various modifications will suggest themselves to those skilled in the art. For example, while the compartment has been described as being employed in the ceiling of a vehicle's passenger compartment, the compartment could be employed with equal utility in the instrument panel thereof. Furthermore, the compartment may be employed alone or in combination with various other electrical accessories such as reading lights, digital displays and the like, in a console. While a specific number of indicia, lever apertures and pins have been illustrated, greater or lesser numbers of these elements may be employed as will be determined by the range of transmitter configurations which the compartment is designed to accommodate. While a generally linear, longitudinal distribution of lever apertures has been shown, it will be appreciated that the apertures may be laterally spaced from one another as well as longitudinally spaced, again depending upon the range of transmitter configurations with which the compartment is adapted to be used. It is intended by the claims to cover these and any other modifications which may suggest themselves to those skilled in the art.

Having thus described the invention, what is claimed is:

1. In a compartment for accommodating a remote transmitter, said transmitter having a switch which, when actuated, effects the operation of said transmitter, said compartment including a manually operable actuating member interengageable with said transmitter switch for the actuation thereof, and means for mechanically connecting said actuating member with said actuator switch, the improvement characterized by:
    said connecting means including an adjustably positionable foot for effecting longitudinal and lateral alignment of said connecting means with said transmitter switch throughout a range of locations thereof within said compartment for adaptation of said compartment to various remote transmitter configurations.

2. The compartment of claim 1 characterized by:
    said connecting means comprising a pivotable member and
    said foot being attachable to said pivotable member at various locations thereon.

3. The compartment of claim 2 characterized by:
said pivotable member comprising a lever having a plurality of spaced apertures disposed longitudinally therealong and
said foot comprising at least one pin receivable in part within any of said spaced apertures.

4. The compartment of claim 2 characterized by said pin being receivable within said spaced apertures by snap-fit engagement therewith.

5. The compartment of claim 2 characterized by said foot comprising one of a plurality of pins of diverse dimensions severably joined to said pivotable member along the edges thereof.

6. The compartment of claim 1 characterized by:
said compartment including a door for access to the interior thereof, said door including
an outer panel;
an inner panel spaced from said outer panel; and
means for attaching said connecting means to said door between said inner and outer panels.

7. The compartment of claim 6 characterized by:
said connecting means comprising a lever; and
said attaching means comprising a pivot mount engageable with an inner end of said lever.

8. The compartment of claim 7 characterized by:
said lever including a plurality of spaced holes thereon;
said foot comprising at least one pin receivable within any of said spaced holes for extension inwardly from said lever and
said inner panel including an aperture therein through which said pin is extendable for engagement with said transmitter switch.

9. The compartment of claim 8 characterized by said inner panel including on an inside surface thereof, means for mounting said transmitter thereto such that said transmitter switch is exposed through said aperture in said inner panel.

10. The compartment of claim 9 characterized by said inner panel including indicia thereon for locating said transmitter with respect to said inner panel aperture for aiding in the alignment of said transmitter switch with said one pin received within an appropriate one of said holes.

* * * * *